United States Patent
Her et al.

(10) Patent No.: US 12,498,755 B2
(45) Date of Patent: Dec. 16, 2025

(54) WEARABLE ELECTRONIC DEVICE INCLUDING PROJECTION DISPLAY

(71) Applicant: SAMSUNG ELECTRONICS CO., LTD., Suwon-si (KR)

(72) Inventors: Yongkoo Her, Suwon-si (KR);
Kyongtae Park, Suwon-si (KR);
Kiwoo Kim, Suwon-si (KR);
Seoungyong Park, Suwon-si (KR);
Taeil Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 551 days.

(21) Appl. No.: 17/879,103

(22) Filed: Aug. 2, 2022

(65) Prior Publication Data

US 2023/0033151 A1   Feb. 2, 2023

Related U.S. Application Data

(63) Continuation of application No. PCT/KR2022/008591, filed on Jun. 17, 2022.

(30) Foreign Application Priority Data

Jul. 30, 2021   (KR) .................. 10-2021-0100985

(51) Int. Cl.
*G06F 1/16* (2006.01)
*G02B 3/00* (2006.01)
(Continued)

(52) U.S. Cl.
CPC ........... *G06F 1/163* (2013.01); *G02B 3/0056* (2013.01); *G03B 21/145* (2013.01);
(Continued)

(58) Field of Classification Search
CPC .............. G03B 21/145; G03B 21/2013; G03B 21/2033; G03B 21/208; G06F 1/1639; G06F 1/1647; G06F 1/163
(Continued)

(56) References Cited

U.S. PATENT DOCUMENTS 8,851,682 B2   10/2014   Tanigawa et al.
9,651,991 B2   5/2017   Kim et al.
(Continued)

FOREIGN PATENT DOCUMENTS

CN   103426875 A   * 12/2013
JP   2016-149730   8/2016
(Continued)

OTHER PUBLICATIONS

Translation of CN 103426875 (Year: 2025).*
Search Report and Written Opinion dated Oct. 7, 2022 issued in International Patent Application No. PCT/KR2022/008591.

*Primary Examiner* — Jerry L Brooks
(74) *Attorney, Agent, or Firm* — Nixon & Vanderhye, P.C.

(57) ABSTRACT

Disclosed is a wearable electronic device. The wearable electronic device includes: a display module comprising a display; a housing to which the display module is coupled; and a projection display disposed on a side portion of the housing and configured to display information on a display area adjacent to the housing, the projection display may include: a substrate disposed along a mounting surface provided on a side portion of the housing; a plurality of light-emitting devices comprising light-emitting circuitry disposed on the substrate in a grating arrangement; and a plurality of micro-lenses covering a light-emitting surface of the plurality of light-emitting devices.

13 Claims, 17 Drawing Sheets

(51) Int. Cl.
  *G03B 21/14* (2006.01)
  *G03B 21/20* (2006.01)

(52) U.S. Cl.
  CPC ..... *G03B 21/2013* (2013.01); *G03B 21/2033* (2013.01); *G03B 21/208* (2013.01); *G06F 1/1639* (2013.01); *G06F 1/1647* (2013.01)

(58) Field of Classification Search
  USPC .......................................................... 359/630
  See application file for complete search history.

(56) References Cited

U.S. PATENT DOCUMENTS

| | | | |
|---|---|---|---|
| 9,690,376 B2 | 6/2017 | Davis et al. | |
| 9,811,818 B1 | 11/2017 | Xing | |
| 10,061,387 B2 | 8/2018 | Toney et al. | |
| 10,234,826 B2 | 3/2019 | Lee et al. | |
| 11,262,841 B2 | 3/2022 | Davis et al. | |
| 2014/0055352 A1 | 2/2014 | Davis et al. | |
| 2016/0018846 A1 | 1/2016 | Zenoff | |
| 2017/0123487 A1* | 5/2017 | Hazra | G06F 3/0482 |
| 2017/0229096 A1 | 8/2017 | Huang et al. | |
| 2017/0294480 A1 | 10/2017 | Kwon | |
| 2018/0129284 A1 | 5/2018 | Davis et al. | |
| 2019/0094548 A1 | 3/2019 | Nicholson et al. | |
| 2020/0218312 A1* | 7/2020 | Connor | G06F 1/1649 |
| 2021/0247840 A1 | 8/2021 | Yoon | |

FOREIGN PATENT DOCUMENTS

| | | |
|---|---|---|
| KR | 10-1691633 | 1/2017 |
| KR | 10-2017-0044112 | 4/2017 |
| KR | 10-2017-0116631 | 10/2017 |
| KR | 10-2054951 | 12/2019 |
| KR | 10-2065687 | 2/2020 |
| KR | 10-2020-0021670 | 3/2020 |

\* cited by examiner

WEARABLE ELECTRONIC DEVICE INCLUDING PROJECTION DISPLAY

CROSS-REFERENCE TO RELATED APPLICATIONS

This application is a bypass continuation of International Application No. PCT/KR2022/008591 designating the United States, filed on Jun. 17, 2022, in the Korean Intellectual Property Receiving Office and claiming priority to Korean Patent Application No. 10-2021-0100985, filed on Jul. 30, 2021, in the Korean Intellectual Property Office, the disclosures of which are incorporated by reference herein in their entireties.

BACKGROUND

Field

This disclosure relates to a wearable electronic device including a projection display.

Description of Related Art

A portable electronic device is generally equipped with a flat panel display device and a battery, and has a bar type, a folder type, and a sliding type appearance. Recently, according to the development of an electronic communication technology, an electronic device is miniaturized, so that a wearable electronic device that may be worn on a part of a body such as the wrist or the head is commercialized.

A wearable electronic device may, for example, have a shape such as a watch or glasses, having good portability, and can satisfy needs of a consumer as various functions are aggregated, such as a mobile communication terminal in a miniaturized device.

For wearable electronic devices in the form of a watch, the screen size has a screen size of, for example, 2 inches or less in order to satisfy the needs (e.g., miniaturization, light weight, etc.) of the consumers. Such watch-type wearable electronic devices have a small screen with a small size letter or limited amount of information to provide information such as time, date information, character, exercise amount, heart rate, etc. As described above, if the size of the character displayed on the small screen is small or the amount of information is large, there is a problem that it is difficult to check the information.

SUMMARY

Embodiments of the disclosure may provide a wearable electronic device including a projection display capable of providing more information through a large screen while satisfying characteristics (e.g., miniaturization, light weight) required for a wearable electronic device by displaying a large screen image on a part of a body wearing the wearable electronic device.

According to various example embodiments, a wearable electronic device includes: a display module including a display; a housing to which the display module is coupled; and a projection display disposed on a side portion of the housing configured to display information on a display area adjacent to the housing, the projection display may include: a substrate disposed along a mounting surface provided on a side portion of the housing; a plurality of light-emitting devices comprising light-emitting circuitry disposed on the substrate in a grating arrangement; and a plurality of micro-lenses covering a light-emitting surface of the plurality of light-emitting devices.

The wearable electronic device according to various example embodiments may include: a first display, a housing to which the first display is coupled and a second display disposed on a side portion of the housing configured to display information on a display area adjacent to the housing, the second display may include: a plurality of light-emitting devices comprising light-emitting circuitry disposed in a grating arrangement, and a plurality of micro-lenses covering at least one light-emitting device, wherein the plurality of micro-lenses may have different thicknesses so that focal distances of light projected from a plurality of light-emitting devices are different.

According to various example embodiments of the disclosure, information may be easily checked by displaying information in a display area larger than a display area of a display module on a part of a body wearing a wearable electronic device through a projection display provided in the wearable electronic device. In addition, various effects that are directly or indirectly understood through the present disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
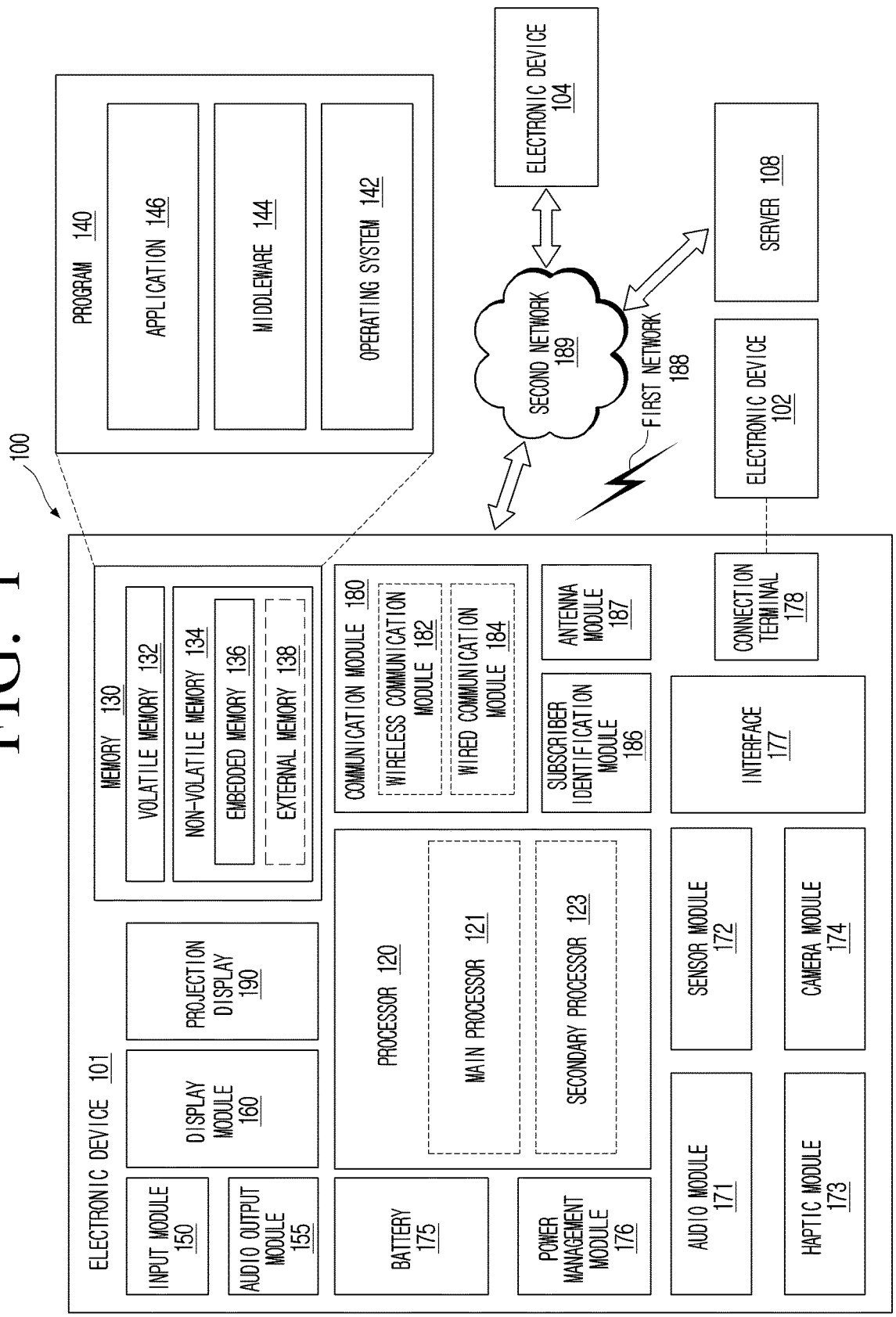
FIG. 1 is a block diagram illustrating an example configuration of a wearable electronic device in a network environment according to various embodiments.

Terms used in the present disclosure are briefly described, and the disclosure will be described in greater detail. In describing the disclosure, the specific description of the related known-art may be omitted, and the duplicate description of the same or similar configuration may be omitted.

The terms used in the disclosure and the claims are general terms identified in consideration of the functions of various embodiments of the disclosure. However, these terms may vary depending on intention, legal or technical interpretation, emergence of new technologies, and the like of those skilled in the related art. In addition, in some cases, a term may be arbitrarily selected, in which case the term will be described in greater detail in the description of the corresponding disclosure. Thus, the term used in this disclosure should be defined based on the meaning of term, not a simple name of the term, and the contents throughout this disclosure.

One or more example embodiments of the disclosure are illustrated in the drawings and are described in greater detail in the detailed description. However, it is to be understood that the disclosure is not limited to the one or more example embodiments, but includes all modifications, equivalents, and substitutions without departing from the scope and spirit of the disclosure. Also, well-known functions or constructions may not described in detail where they would be deemed to obscure the disclosure with unnecessary detail.

In addition, expressions "first", "second", or the like, used in the disclosure may indicate various components, will be used simply in order to distinguish one component from the other components, and do not limit the corresponding components. For example, the first component may be named the second component and the second component may also be similarly named the first component, without departing from the scope of the disclosure.

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereto.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like are to be realized in an individual hardware, the components may be integrated in at least one module or chip and be realized in at least one processor.

Embodiments of the disclosure will be described in greater detail with reference to the accompanying drawings to aid in the understanding of those of ordinary skill in the art. However, the disclosure may be realized in various different forms and it should be noted that the disclosure is not limited to the various embodiments described herein. Further, in the drawings, parts not relevant to the description may be omitted, and like reference numerals may be used to indicate like elements.

Further, the embodiments have been described in detail below with reference to the accompanied drawings and the descriptions to the accompanied drawings, but it should be understood that the disclosure is not limited by the embodiments.

Hereinafter, the wearable electronic device according to various embodiments of the disclosure will be described in greater detail, referring to the drawings.

FIG. 1 is a block diagram illustrating an example configuration of a wearable electronic device in a network environment according to various embodiments. For convenience, a device according to various embodiments of the disclosure is referred to as an "electronic device", but a device according to various embodiments may be an electronic device, a wireless communication device, a display device, or a portable communication device.

Referring to FIG. 1, in a network environment 100, a wearable electronic device 101 may communicate with an electronic device 102 via a first network 188 (e.g., a short-range wireless communication network) or communicate with at least one of an electronic device 104 or a server 108 via a second network 189 (e.g., wide area network). According to an example embodiment, the wearable electronic device 101 may communicate with the electronic device 104 via the server 108. According to an example embodiment, the wearable electronic device 101 may include a processor 120, a memory 130, an input device 150, an audio output module 155, a display module 160, an audio module 171, a sensor module 172, a haptic module 173, a camera module 174, a battery 175, a power management module 176, an interface 177, a connection terminal 178, a communication module 180, a subscriber identification module 186, and/or an antenna module 187.

In various embodiments, at least one (e.g., connection terminal 178) of these components may be omitted from wearable electronic device 101, or one or more other components may be added. In various embodiments, some of these components (e.g., a sensor module 172, camera module 174, or antenna module 187) may be implemented as a single component (e.g., display module 160).

According to an embodiment, the wearable electronic device 101 may display various images. The image may include a still image and a moving image, and the wearable electronic device 101 may display various images, such as broadcast content, multimedia content, and the like. The wearable electronic device 101 may display a user interface (UI) and an icon. For example, the display module 160 may include a display driver integrated circuit (IC) (not shown) and may display an image based on an image signal received from the processor 120. For example, the display driver IC may generate a driving signal of a plurality of sub-pixels based on an image signal received from the processor 120, and display an image by controlling light emission of the plurality of sub-pixels based on the driving signal.

According to an embodiment, the processor 120 may include various processing circuitry and control the overall operation of the wearable electronic device 101. The processor 120 may include one or a plurality of processors. For example, the processor 120 may perform the operation of the wearable electronic device 101 according to various embodiments of the disclosure by executing at least one instruction stored in the memory.

According to an embodiment, the processor 120 may be implemented, for example, and without limitation, as a digital signal processor (DSP), a microprocessor, a graphics processing unit (GPU), artificial intelligence (AI) processor, a neural processing unit (NPU), and a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an ARM processor, or the like, or may be defined by the corresponding term. In addition, the processor 120 may be implemented as a System on Chip (SoC) or large scale integration (LSI) embedded with a processing algorithm, and may be implemented in the form of a field programmable gate array (FPGA).

According to an embodiment, the processor 120 may be configured to control a hardware connected to the processor 120 or software elements by operating an operating system or an application program, and perform various data processing and operations. Further, the processor 120 may be configured to load an instruction or data received from at least one from among the other elements in a volatile memory and process the loaded instruction or data, and store various data in a nonvolatile memory.

According to an embodiment, the processor 120 may execute software (e.g., program 140) to control at least one other component (e.g., hardware or software component) of the wearable electronic device 101 coupled to the processor 120, and may perform various data processing or operations. According to an embodiment, as at least a part of the data processing or operation, the processor 120 may store the command or data received from another component (e.g., the sensor module 172 or the communication module 180) to a volatile memory 132, process command or data stored in the volatile memory 132, and store the result data in a non-volatile memory 134. The non-volatile memory 134 may include an embedded memory 136 and an external memory 138. According to an example embodiment, the processor 120 may include a main processor 121 (e.g., a central processing unit or an application processor), and/or a secondary processor 123 (e.g., a graphics processing unit, a neural processing unit (NPU), an image signal processor, a sensor hub processor, or a communication processor) which may be operated together or independently. For example, if the wearable electronic device 101 includes the main processor 121 and the secondary processor 123, the secondary processor 123 may be configured to use lower power than the main processor 121, or to be specialized for a specified function. The secondary processor 123 may be implemented separately from, or as a part of, the main processor 121.

According to an embodiment, the secondary processor 123 may, for example, in place of the main processor 121 while the main processor 121 is in an inactive state (for example: sleep) or along with the main processor 121 while the main processor 121 is in an active state (for example: execution of an application) control a part of the functions or states related to at least one component (for example: display module 160, the sensor module 172, or the communication module 180) among the components of the wearable electronic device 101. According to an example embodiment, the secondary processor 123 (e.g., an image signal processor or a communication processor) may be implemented as a part of a functionally related other components (e.g., camera module 174 or communication module 180). According to an embodiment, the secondary processor 123 (e.g., a neural network processing device) may include a hardware structure specialized for processing an artificial intelligence model. The artificial intelligence model may be generated through machine learning. Such learning may be performed, for example, by the electronic device 101 in which an artificial intelligence model is performed, or may be performed via a separate server (e.g., server 108). The learning algorithms may include, but are not limited to, supervised learning, unsupervised learning, semi-supervised learning, or reinforcement learning. The artificial intelligence model may include a plurality of artificial neural network layers. The artificial neural network may be, but is not limited to, a deep neural network (DNN), a convolutional neural network (CNN), a recurrent neural network (RNN), a restricted Boltzmann machine, a deep belief network (DBN), a bi-directional recurrent deep neural network (BRDNN), deep Q-networks, or a combination of two or more thereof. The artificial intelligence model may additionally or alternatively include a software structure, in addition to the hardware structure.

According to an embodiment, the memory 130 may store various data used by at least one component (e.g., processor 120 or sensor module 172) of the wearable electronic device 101. The data may include, for example, software (e.g., program 140) and input data or output data related with software instructions. The memory 330 may include the volatile memory 132 or non-volatile memory 134.

According to an embodiment, the program 140 may be stored in the memory 130 as software, and include, for example, an operating system 142, middleware 144, or an application 146.

According to an embodiment, the input module 150 may receive a command or data to be used for the components (e.g., processor 120) of the wearable electronic device 101 from the outside (e.g., user) of the wearable electronic device 101. The input module 150 may further include, but is not limited to, a microphone, a dome switch, a touch pad (contact capacitive type, a pressure-type resistive film method, an infrared sensing method, a surface ultrasonic conduction method, an integrated tension measurement method, a piezo-effect method, etc.).

According to an embodiment, the sound output module 155 may output a sound signal to the outside of the wearable electronic device 101. The sound output module 155 may include, for example, a speaker or a receiver. The speaker may be used for general purposes, such as multimedia playback or recording playback, and the receiver may be used to receive incoming calls. According to an example embodiment, the receiver may be implemented separately from, or as a part of, the speaker.

According to an embodiment, the display module 160 may visually provide information to an outside (e.g., user) of the wearable electronic device 101. The display module 160 may include, for example, a display, a hologram device, a projector, or a control circuit for controlling the device. According to an embodiment, the display module 160 may include a touch sensor (not shown) which is set to detect a touch or a pressure sensor which is set to measure intensity of power generated by the touch.

According to an embodiment, the audio module 170 may convert sound into an electric signal, or convert an electric signal to sound. According to an example embodiment, the audio module 170 may acquire sound through the input module 150, or output sound through the sound output module 155, or an external electronic device (e.g., electronic device 102) (e.g., speaker or headphone) which is directly or wirelessly connected to the wearable electronic device 101.

According to an embodiment, the sensor module 172 may detect the operation state of the wearable electronic device 101 (e.g., power or temperature), or an external environment state (e.g., a user state), and generate an electrical signal or a data value corresponding to the detected state. According to an embodiment, the sensor module 172 may include, for example, a terrestrial magnetic sensor, an acceleration sensor, a position sensor, and a gyroscope sensor. In addition, sensors for detecting a bio-signal such as a bio-signal of a user, for example, an electrocardiography (ECG) signal, a galvanic skin reflex (GSR), a pulse wave, or the like, may be provided. In addition, a temperature sensor, a humidity sensor, an infrared sensor, an atmospheric pressure sensor, a proximity sensor, a magnetic sensor, a grip sensor, a color sensor, an illuminance sensor, and the like, may be further included.

According to an embodiment, the haptic module 173 may convert an electrical signal into a mechanical stimulus (e.g., vibration or motion) or an electrical stimulus that a user may recognize through a tactile or kinesthetic sense. According to an embodiment, the haptic module 173 may include, for example, a motor, a piezoelectric element, or an electric stimulation device.

According to an embodiment, the camera module 174 may photograph a still image or a moving image. According to an embodiment, the camera module 174 may include one or more lenses, image sensors, image signal processors, or flashes.

According to an embodiment, the power management module 175 may manage power supplied to the wearable electronic device 101. According to an embodiment, the power management module 175 may be implemented as, for example, at least a part of power management integrated circuit (PMIC).

According to an embodiment, the battery 176 may supply power to at least one component of the wearable electronic device 101. According to an embodiment, the battery 176 may include, for example, a non-rechargeable primary battery, a rechargeable auxiliary battery, or a fuel cell.

According to an embodiment, the interface 177 may support one or more designated protocols that may be used to directly or wirelessly connect the wearable electronic device 101 to an external electronic device (e.g., the electronic device 102).

According to an embodiment, the connection terminal 178 may include a connector through which the wearable electronic device 101 may be physically connected to an external electronic device (e.g., the electronic device 102).

According to an embodiment, the communication module 180 may support establishment of direct (e.g.: wired) communication channel between the wearable electronic device 101 and an external electronic device (e.g., electronic device 102, electronic device 104, or server 108) or wireless communication channel, and communication through the established communication channels. The communication module 180 may include one or more communication processors which are operated independently of the processor 120 (e.g., application processor) and support direct (e.g., wired) communication or wireless communication. According to an embodiment, the communication module 180 may include a wireless communication module 182 (e.g., cellular communication module, near field wireless communication module, or global navigation satellite system (GNSS) communication module) or wired communication module 184 (e.g., local area network (LAN) communication module, or power line communication module). The corresponding communication module among these communication modules may communicate with an external electronic device via the first network 188 (e.g., Bluetooth, WiFi direct or near field communication network such as infrared data association (IrDA)) or the second network 189 (e.g., telecommunication network such as legacy cellular network, 5G network, next generation communication network, Internet, or computer network (e.g., LAN or WAN)). These types of communication modules may be incorporated into one component (e.g., a single chip) or implemented with a plurality of components (e.g., a plurality of chips) that are separate from each other. The wireless communication module 182 may confirm or authenticate the wearable electronic device 101 in the communication network such as the first network 188 or the second network 189 using the subscriber information (e.g., international mobile subscriber identity (IMSI)) stored in the subscriber identification module 186.

According to an embodiment, the wireless communication module 182 may support a 5G network and a next generation communication technology, e.g., new radio access technology (NR access technology) after a 4G network. The NR connection technology may support high-capacity data high-speed transmission (enhanced mobile broadband (eMBB)), terminal power minimization, massive machine type communications (mMTC), or ultra-reliable and low-latency communications (URLLC). The wireless communication module 182 may support a high frequency band (e.g., an mmWave band), for example, to achieve a high data transmission rate. The wireless communication module 182 may support technologies such as various technologies for securing performance in a high frequency band, e.g., beamforming, massive multiple-input and multiple-output (MIMO), full dimensional MIMO (FD-MIMO), array antenna, analog beam-forming, or large scale antenna. The wireless communication module 182 may support various requirements defined in the wearable electronic device 101, the external electronic device (e.g., the electronic device 104) or the network system (e.g., the second network 189). According to an embodiment, the wireless communication module 182 may support a peak data rate (e.g., at least 20 Gbps) for realizing eMBB, a loss coverage (e.g., 164 dB or less) for mMTC implementation, or a U-plane latency (e.g., downlink (DL) and uplink (UL) by 0.5 ms or below, respectively, or round trip 1 ms or below) for URLLC implementation.

According to an embodiment, the antenna module 187 may transmit a signal or power to an external device (e.g., an external electronic device) or receive a signal or power from the outside. According to an example embodiment, the antenna module 187 may include one or more antennas (e.g., array antenna), and at least one antenna suitable for a communication method used in a communication network, such as the first network 188 or the second network 189, may be selected by, for example, the communication module 180 from the plurality of antennas.

According to an embodiment, the antenna module 187 may include a plurality of antennas (e.g., an array antenna), and according to another embodiment, the antenna module 187 may include an antenna comprising a conductor made of a conductor or conductive pattern formed over a substrate (e.g., PCB).

According to an embodiment, the antenna module 187 may form an mmWave antenna module. According to an embodiment, the mmWave antenna module may include a printed circuit board, a radio frequency integrated circuit (RFIC) disposed on or adjacent to a first surface (e.g., a bottom surface) of the printed circuit board, and capable of supporting a designated high frequency band (e.g., an mmWave band), and a plurality of antennas (e.g., an array antenna) disposed adjacent to or adjacent to a second surface (e.g., top surface or side) of the printed circuit board and capable of transmitting or receiving a signal of the designated high frequency band.

The signal or power may be transmitted or received between the communication module 180 and an external electronic device via at least one antenna. According to various embodiments, other components (e.g., a radio frequency integrated circuit (RFIC)) other than the radiator may be further formed as part of the antenna module 187.

At least a part of the components may be interconnected through the communication method (e.g., bus, general purpose input and output (GPIO), serial peripheral interface (SPI), or mobile industry processor interface (MIPI)) among peripheral devices and exchange a signal (e.g., command or data) from each other.

The command or data may be transmitted or received between the wearable electronic device 101 and the external electronic device 104 via the server 108 connected to the second network 189. Each of the electronic devices 102 and 104 may be devices which are the same or different types from the wearable electronic device 101. According to an embodiment, whole or a part of the operations executed by the wearable electronic device 101 may be executed by one or more external devices among the external electronic devices 102, 104, or 108. For example, when the wearable electronic device 101 has to perform a function or service automatically, or in response to a request from a user or another device, the wearable electronic device 101 may request one or more external electronic devices to perform at least a part of the function or the service instead of, or in addition to, performing the function or service by itself. The one or more external electronic devices that have received the request may execute at least a portion of the requested function or service, or an additional function or service associated with the request, and transmit the result of the execution to the wearable electronic device 101. The wearable electronic device 101 may process the result as is or additionally, and provide the result as at least a portion of the response to the request. For this purpose, for example, cloud computing, distributed computing, mobile edge computing (MEC) or client-server computing technology may be used. The wearable electronic device 101 may provide ultra-low latency services using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or server 108 may be included in a second network 199. The wearable electronic device 101 may be applied to an intelligent service (for example, smart home, smart city, smart car, or health care) on the basis of 5G communication technology and IoT-related technology.

According to an embodiment, the projection display 190 may project an image on a portion of the body adjacent to the wearable electronic device 101 when the wearable electronic device 101 is worn on a body (e.g., a wrist). The projection display 190 will be described in detail with reference to the accompanying drawings.

Figure 2:
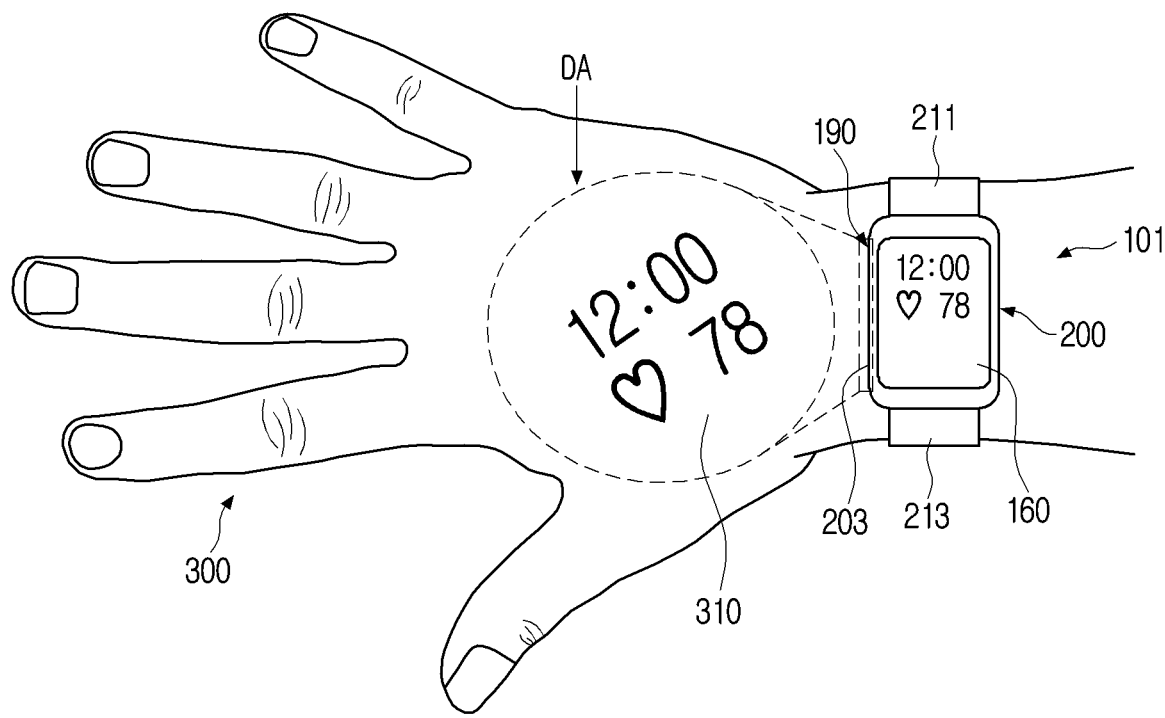
FIG. 2 is a diagram illustrating an example of wearing a wearable electronic device on a body and displaying an enlarged screen on a portion of a body through a projection display according to various embodiments.
Figure 3:
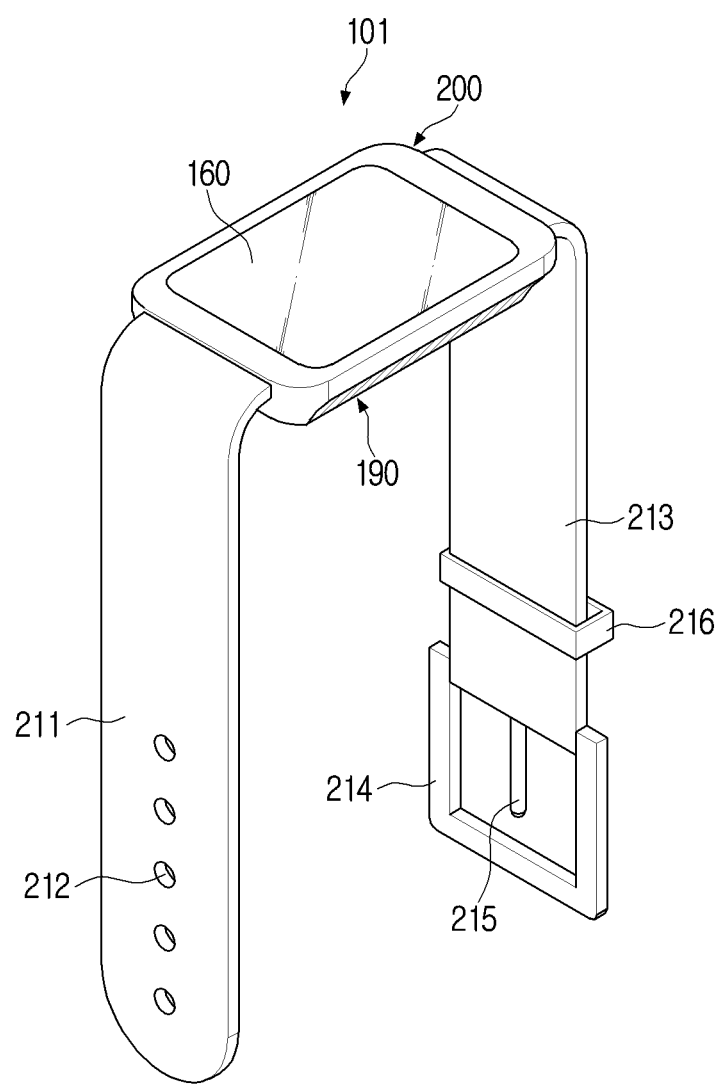
FIG. 3 is a perspective view illustrating a wearable electronic device according to various embodiments.
Figure 4:
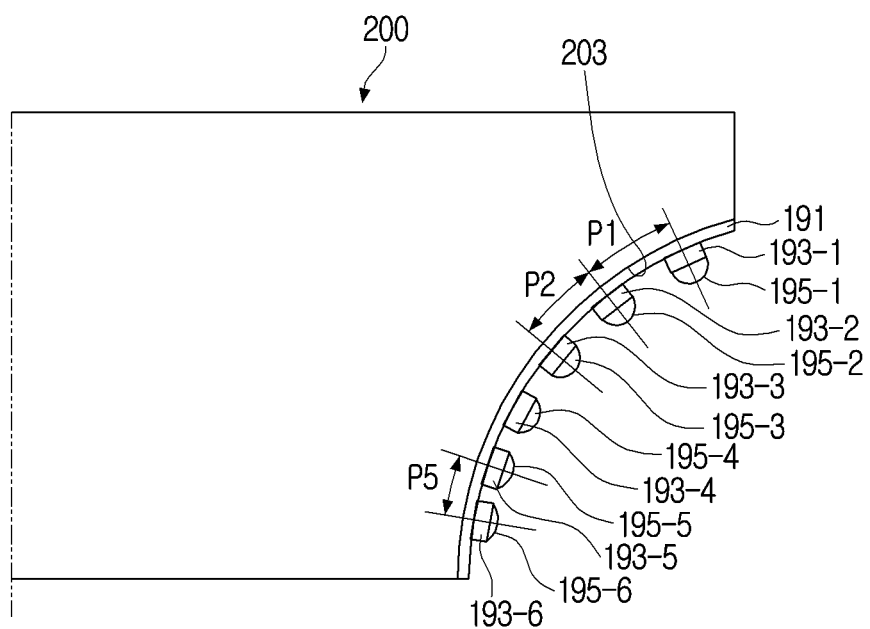
FIG. 4 is a diagram illustrating an example projection display disposed outside a wearable electronic device according to various embodiments.

FIG. 2 is a diagram illustrating an example of wearing a wearable electronic device on a body and displaying an enlarged screen on a portion of a body through a projection display according to various embodiments. FIG. 3 is a perspective view illustrating an example wearable electronic device according to various embodiments. FIG. 4 is a diagram illustrating an example projection display disposed outside a wearable electronic device according to various embodiments.

Referring to FIG. 2, the wearable electronic device 101 may be worn on a portion of the body, for example, the wrist. In this example, the light projected from the projection display 190 included in the wearable electronic device 101 may be projected onto a portion of the display area (DA) (e.g., back of the hand 310 that is part of the hand 300 as shown in FIG. 2).

The information displayed on the DA by the projection display 190 may be displayed by enlarging the same information as information (e.g., time, heart rate, video, image, etc.) displayed in the display module 160.

The information displayed on the DA by the projection display 190 may be displayed by enlarging and displaying only a portion of the information displayed on the display module 160. For example, when the information displayed on the display module 160 indicates the current time and the heart rate together as shown in FIG. 2, the DA may display only the current time or selectively display only the heart rate.

The information displayed on the DA by the projection display 190 may display information that is different from the information displayed by the display module 160.

Referring to FIG. 3, the wearable electronic device 101 may include a housing 200 in which components included in the wearable electronic device 101 described above with reference to FIG. 1 are disposed, and a first strap 211 and a second strap 213 connected to both sides of the housing 200.

According to an embodiment, the first strap 211 may be formed with a plurality of holes 212 at regular intervals. The second strap 213 may include a buckle 214 to which the first strap 211 is coupled to be detachably connected to the first strap 211, a fixing pin 215 inserted into the hole 212, and a band 216 into which the first strap 211 is inserted so as to adhere the first strap 211 to the second strap 213.

The embodiment may include, but is not limited to, first and second straps 211 and 213 as a means for wearing the wearable electronic device 101 on the body. For example, instead of the first and second straps 211 and 213, the wearable electronic device 101 may be worn on the body using a band not illustrated in drawings. For example, the band may be formed of a material of which both ends are connected to both sides of a housing 200, and having an elastic force (e.g., synthetic resin, fabric, etc.). Accordingly, the wearable electronic device 101 may be stably worn on a part of the body through the band.

According to an embodiment, the housing 200 may include a mounting surface 203 on which the projection display 190 may be disposed, as shown in FIG. 4, on an other side where the first and second straps 211 and 213 are not connected.

According to an embodiment, the mounting surface 203 may be formed of a curved surface having a predetermined (e.g., specified) curvature. In this example, the mounting surface 203 may have an arc shape that is recessed inward of the housing 200. For example, an area in which the mounting surface 203 is provided at a side portion of the housing 200 may be an area extending from a location adjacent to the upper end of the side of the housing 200 to the bottom of the housing 200. The lower end of the mounting surface 203 may be in an inward direction of the housing 200 with respect to the upper end of the mounting surface 203. As described above, by forming the mounting surface 203 as a concave curved surface, the orientation angle of the light projected from the projection display 190 to the display area (DA) may be set differently for each row of the plurality of light-emitting devices 193-1, 193-2, 193-3, 193-4, 193-5, and 193-6 (which may be referred to as light-emitting devices 193-1 to 193-6) arranged on the substrate 191. This will be described in greater detail below while describing the arrangement of the plurality of light-emitting devices 193-1 to 193-6.

According to an embodiment, the projection display 190 may be coupled to the mounting surface 203 with a curvature corresponding to the mounting surface 203. Although not shown in the drawings, a hole through which a predetermined wiring electrically connecting components (e.g., the processor 120, the power management module 176, etc.) inside the housing may be formed in the mounting surface 203.

Referring to FIG. 4, the projection display 190 may include a substrate 191, a plurality of light-emitting devices 193-1 to 193-6 arranged on the substrate, and a plurality of micro-lenses 195-1, 195-2, 195-3, 195-4, 195-5, and 195-6 (which may be referred to as micro-lenses 195-1 to 195-6) for projecting light emitted from each of the light-emitting devices 193-1 to 193-6 to the DA.

According to an embodiment, the substrate 191 may be a flexible printed circuit (FPC) disposed on the mounting surface 203 with a curvature corresponding to the curvature of the mounting surface 203. In this example, the substrate 191 may have the same or almost same curvature as the mounting surface 203 while being attached along the mounting surface 203. If the substrate 191 is made of a material without flexibility, the substrate 191 may be bent to have a curvature corresponding to the curvature of the mounting surface 203 before the substrate 191 is attached to the mounting surface 203. The bending process may be performed in a state where the plurality of light-emitting devices 193-1 to 193-6 and the plurality of micro-lenses 195-1 to 195-6 are mounted on the substrate 191.

According to an embodiment, the substrate 191 may be attached to the mounting surface 203 by an adhesive or may be fixed by a predetermined coupling structure.

According to an embodiment, the substrate 191 may be made of a transparent glass material (principal component is $SiO_2$) However, the embodiment is not limited thereto, and may be formed of a transparent or translucent polymer. In this example, the polymer may be an insulating organic material such as, for example, and without limitation, polyether sulfone (PES), polyimide (PI), polyethylene terephthalate (PET), polyethylene naphthalate (PEN), polycarbonate (PC), and the like.

According to an embodiment, the substrate 191 is provided with a plurality of TFTs (not shown). In the disclosure, the TFT is not limited to a specific structure or type. For example, the TFT of the disclosure may include a substrate that may be implemented as a type such as, for example, and without limitation, amorphous silicon (a-Si) TFT, low temperature polycrystalline silicon (LTPS) TFT, low temperature polycrystalline oxide (LTPO) TFT, hybrid oxide and polycrystalline silicon (HOP) TFT, liquid crystalline polymer (LCP) TFT, organic TFT (OTFT), graphene TFT, or the like.

According to an embodiment, the plurality of light-emitting devices 193-1 to 193-6 may be, for example, a micro light emitting diode (LED) having a size of about 50 μm or less, as an inorganic light-emitting device. In this example, the micro LED may be a flip chip type in which a positive electrode and a negative electrode are disposed on the opposite surface of the light emitting surface. However, the embodiment is not limited thereto, and may include a lateral chip type or a vertical chip type. Although not shown in the drawings, according to various embodiments, the light emitting device applied to the substrate 191 may be an organic light emitting diode (OLED) without being limited to an inorganic light emitting device.

Figure 5:
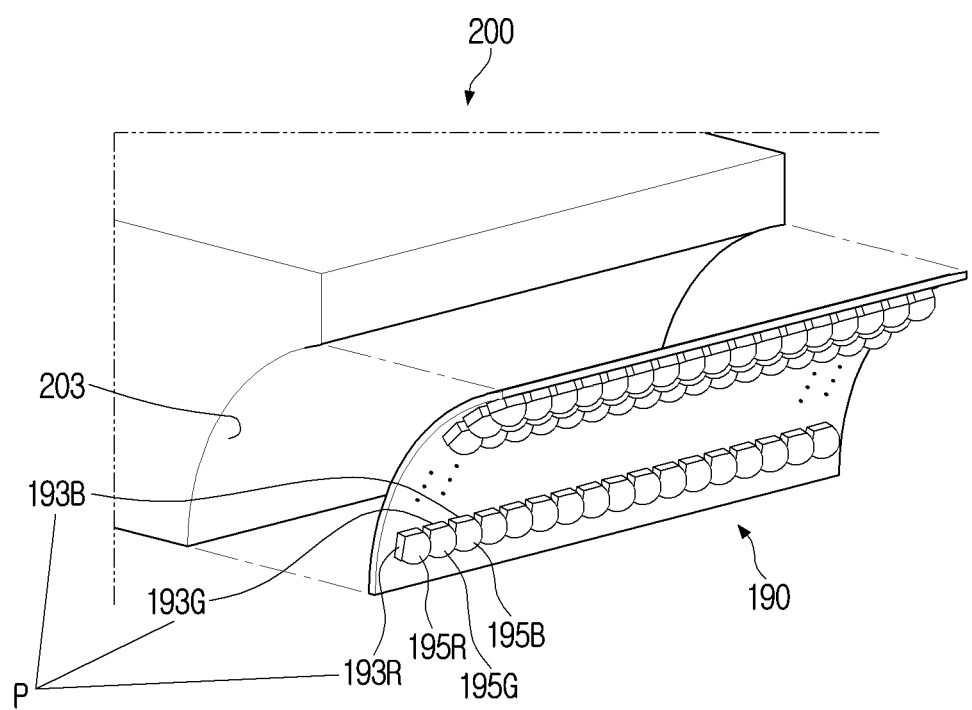
FIG. 5 is a partial perspective sectional view illustrating an example in which the projection display is coupled to the mounting surface of a housing according to various embodiments.

FIG. 5 is a partial perspective sectional view illustrating an example in which the projection display is coupled to the mounting surface of a housing according to various embodiments.

According to an embodiment, the plurality of light emitting devices 193-1 to 193-6 may be arranged in a grating arrangement on the substrate 191 as shown in FIG. 5. However, the arrangement of the plurality of light-emitting devices 193-1 to 193-6 on the substrate needs not necessarily be limited to the grating arrangement. For example, a number of light emitting devices may be arranged in a pentile RGBG scheme. The pentile RGBG scheme is a method for arranging the number of red, green, and blue sub-pixels in a ratio of 1:2:1 (RGBG) using a characteristic that a human may identify blue less and identify green most well. The pentile RGBG scheme is effective in increasing the yield, lowering the unit cost, and implementing high resolution on a small screen.

According to an embodiment, the plurality of light emitting devices 193-1 to 193-6 have a plurality of pixels. One pixel (P) may include a plurality of sub-pixels 193R, 193G, and 193B and corresponding micro-lenses 195R, 195G and 195B that emit different lights. The member number 193R is a sub-pixel emitting red light, the member number 193G is a sub-pixel emitting green light, and the member number 193B may be a sub-pixel emitting blue light. Since the "sub-pixel" and the "light-emitting device" are terms indicating the same or similar structure, they may be interchangeably used in this disclosure.

According to an embodiment, the red sub-pixel 193R may include a micro LED emitting blue light and a color conversion layer (e.g., a red phosphor, a red quantum dot, etc.) to emit red light using blue light as excitation light. The green sub-pixel 193G may include a micro LED emitting blue light and a color conversion layer (e.g., a red phosphor, a red quantum dot, etc.) to emit green light using blue light as excitation light. The blue sub-pixel 193B may include a micro LED emitting blue light without a separate color conversion layer. In this example, the blue sub-pixel 193B may have thickness lower that the thickness of the red and green sub-pixels 193R, 193G, each including the color conversion layer. In this example, the blue sub-pixel 193B may further include an optical layer corresponding to the thickness of the transparent color conversion layer so as to have the same or nearly same thickness as the red and green sub-pixels 193R, 193G. The color conversion layer and the optical layer may be stacked on the light emitting surface of the corresponding micro LED, respectively.

However, the embodiment is not limited thereto and each of the sub-pixels 193R, 193G, and 193B may apply a micro LED emitting green light. In this example, the red sub-pixel 193R may include a color conversion layer (e.g., a red phosphor, a red quantum dot, etc.) to emit red light using green light as excitation light. The blue sub-pixel 193B may include a color conversion layer (e.g., a blue phosphor, a blue quantum dot, etc.) to emit blue light using green light as excitation light.

According to an embodiment, a number of light emitting devices 193-1 to 193-6 may include a first semiconductor layer, a second semiconductor layer, and an active layer placed between the first semiconductor layer and the second semiconductor layer, respectively.

According to an embodiment, the first semiconductor layer, the active layer, and the second semiconductor layer may be formed using methods such as metal organic chemical vapor deposition (MOCVD), chemical vapor deposition (CVD), plasma-enhanced chemical vapor deposition (PECVD), and the like.

According to an embodiment, the first semiconductor layer may include, for example, a p-type semiconductor layer (anode, an oxidizing electrode). The p-type semiconductor layer may be selected from, for example, and without limitation, GaN, AlN, AlGaN, InGaN, InN, InAlGaN, AlInN, and the like, and p-type dopants such as Mg, Zn, Ca, Sr, Ba, etc. may be doped.

According to an embodiment, the second semiconductor layer may include, for example, an n-type semiconductor layer (cathode, a reduction electrode). The n-type semiconductor layer may be selected from, for example, and without limitation, GaN, AlN, AlGaN, InGaN, InN, InAlGaN, AlInN, and the like, and n-type dopants such as Si, Ge, Sn, etc. may be doped. The light-emitting device is not limited to the above configuration, and for example, the first semiconductor layer may include an n-type semiconductor layer, and the second semiconductor layer may include a p-type semiconductor layer. The active layer is an area where electrons and holes are recombined and may transition to a low energy level according to the recombination of electrons and holes, and generate light having a corresponding wavelength.

According to an embodiment, the active layer may include semiconductor materials, such as amorphous silicon or poly crystalline silicon. However, this embodiment may contain organic semiconductor materials, etc., and may be formed of a single quantum well (SQW) structure or multiple quantum well (MQW) structure.

According to an embodiment, in the plurality of light emitting devices 193-1 to 193-6, the first electrode and the second electrode may be disposed on the opposite surface of the light emitting surface. If the first electrode is an anode electrode, the second electrode may be a cathode electrode. The first and second electrodes may be made of Au or an alloy containing Au, but is not limited thereto.

In the disclosure, a large number of light emitting devices 193-1 to 193-6 are arranged in six rows for the convenience of the description, and the number of rows and columns of a large number of light emitting devices are not limited.

According to an embodiment, the plurality of light emitting devices 193-1 to 193-6 may be arranged on the substrate 191 curved at a curvature corresponding to the mounting surface 203. When the substrate 191 maintains a curvature, the plurality of light-emitting devices 193-1 to 193-6 may have different directional angles for each row. For example, the light emitting devices 193-1 of the first row closest to the upper end of the side of the housing 200 may be arranged to emit light toward the most adjacent portion of the housing 200 in the DA. The light emitting devices 193-2 of the second row may be arranged to emit light from the housing 200 toward a more distant portion than where the light emitting devices 193-1 of the first row project from the DA. In this manner, the remaining row-specific light-emitting devices 193-3 to 193-6 may be arranged to emit light toward a portion gradually away from the housing 200 as the devices are disposed from the side to the lower portion of the housing 200.

As described above, when the plurality of light-emitting devices 193-1 to 193-6 have different directional angles for each row, the light emitted from each of the light-emitting devices 193-1 to 193-6 may be focused by the plurality of micro-lenses 195-1 to 195-6 to be projected to each portion of the display area.

According to an embodiment, the plurality of micro-lenses 195-1 to 195-6 may focus the light emitted from the corresponding light-emitting devices 193-1 to 193-6 to each point of the DA.

According to an embodiment, the plurality of micro-lenses 195-1 to 195-6 may be stacked on the light-emitting surface of the corresponding light-emitting device. The light emitting surface may refer, for example, to the light emitting surface of the micro LED, but is not limited thereto, and when the color conversion layer is stacked on the micro LED, the color conversion layer may refer, for example, to a surface from which light is emitted.

According to an embodiment, as the plurality of light-emitting devices 193-1 to 193-6 have different directional angles for each row, the focal distance from the light-emitting devices 193-1 to 193-6 for each row to the DA need to be set differently.

Figure 6:
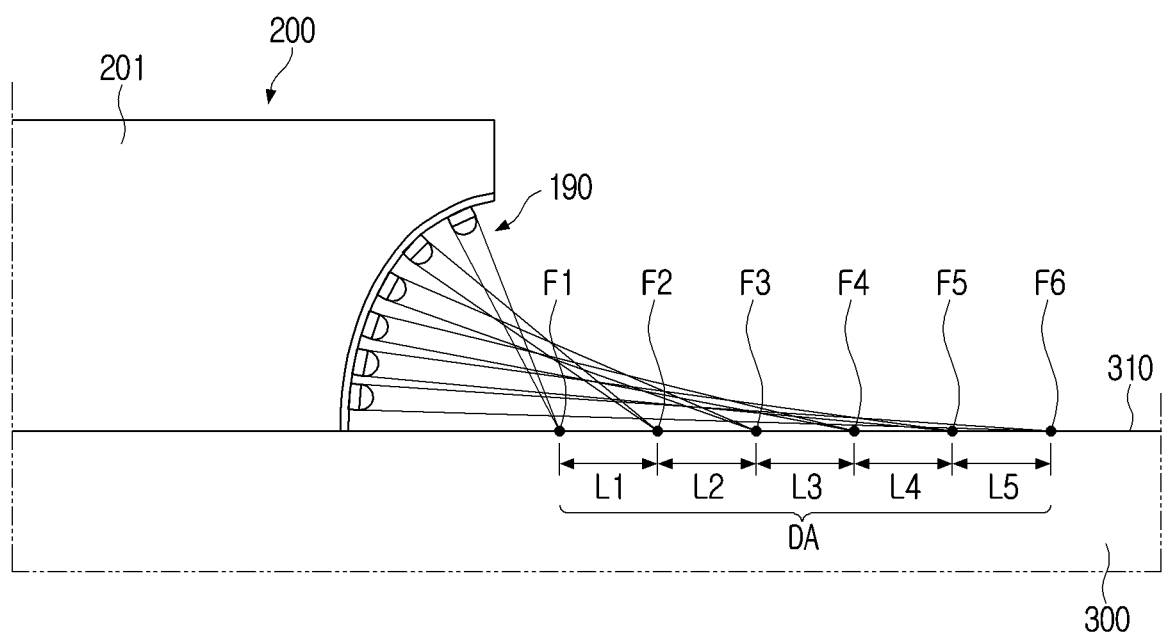
FIG. 6 is a diagram illustrating an example of displaying information in a display area of a part of a body using a projection display according to various embodiments.

For example, as shown in FIG. 6, the micro lenses 195-1 to 195-6 having different thicknesses for each row of the plurality of light-emitting devices may be provided to set the focal distance different from each other. The micro-lenses 195-1 coupled to the light-emitting devices 193-1 (hereinafter, the micro-lenses of the first row) may have the thickest thickness, and the thickness may grow thinner from the micro-lenses 195-2 coupled to each of the light-emitting devices 193-2 of the second row to the micro-lenses 195-6 coupled to the light-emitting devices 193-6 of the sixth row, respectively.

Accordingly, the micro-lenses 195-1 of the first row may focus the light emitted from the light-emitting devices 193-1 of the first row to the first point F1 closest to the housing 200 in the DA. The micro-lenses 195-2 of the second row may focus the light emitted from the light-emitting devices 193-2 of the second row to the second point F2 that is farther from the housing 200 than the first point F1 in the display area DA. The micro-lenses 195-3 to 195-6 of the third to sixth rows may focus the light emitted from the light-emitting devices 193-3 to 193-6 of the third to sixth rows to points F3 to F6 that are gradually farther from the housing than the second point F2 in the display area DA. In the disclosure, the first to sixth points F1 to F6 may be referred to as first to sixth focal points, respectively.

If the distance between the points adjacent to each other is the same or nearly the same, the information displayed on the DA may not be distorted. The distortion may refer, for example, to a portion of the information displayed as an image or a video being gradually narrowed or gradually widened in the DA.

The projection display 190 according to an embodiment may maintain pitches among each row of the plurality of light emitting devices 193-1 to 193-6 different from each other.

Referring to FIG. 4, the first pitch P1 between the light emitting devices 193-1 and 193-2 of the first row and the second row may be set to be smaller than the second pitch P2 between the light-emitting devices 193-2 and 193-3 of the second and third rows. As described above, the pitch between adjacent rows of the light-emitting devices 193-3 to 193-6 of the third to sixth rows may gradually decrease toward the light-emitting devices 193-6 of the sixth row. In this example, the first pitch P2 between the light emitting devices 193-1 and 193-2 of the first row and the second row may be set to be the greatest and the fifth pitch P5 between the fifth and sixth rows of light emitting devices 193-5 and 193-6 may be set to be the smallest.

Figure 7:
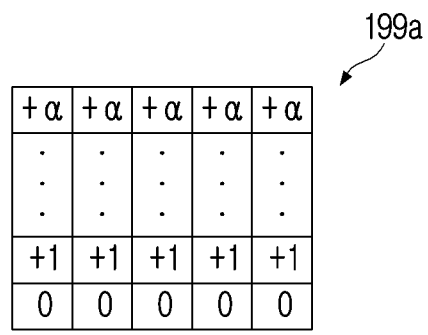
FIG. 7 is a diagram illustrating an example of a lookup table stored in a memory according to various embodiments.
Figure 8:
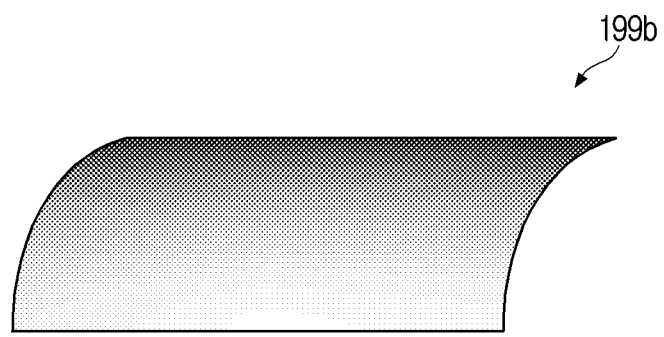
FIG. 8 is a diagram illustrating an example masking image in which each portion corresponding to a plurality of light-emitting devices becomes gradually darker from an upper side toward a lower side according to various embodiments.

FIG. 6 is a diagram illustrating an example of displaying information in a display area of a part of a body using a projection display according to various embodiments. FIG. 7 is a diagram illustrating an example of a lookup table stored in a memory according to various embodiments. FIG. 8 is a diagram illustrating an example masking image in which each portion corresponding to a plurality of light-emitting devices becomes gradually darker from an upper side toward a lower side according to various embodiments.

As described above, as the pitch between each row gradually decreases from the first row to the sixth row, the distances L1 to L5 between the respective points may be maintained the same or nearly the same as in FIG. 6.

According to an embodiment, the plurality of light emitting devices 193-1 to 193-6 may have different luminance depending on the focal distance. For example, with respect to the luminance of the light emitting devices 193-1 having the nearest focal distance, the luminance may be larger toward the light-emitting devices 193-6 having the farther focal distance. Accordingly, an image or a video of the display area DA may be clearly displayed in overall.

As described above, the method of differently controlling the luminance for each row of the plurality of light-emitting devices 193-1 to 193-6 may vary. For example, as shown in FIG. 7, the processor 120 may control the luminance and color of the plurality of light-emitting devices 193-1 to 193-6 by controlling to apply a driving current (a value) that gradually decreases from the light-emitting devices 193-1 of the first row to the light-emitting devices 193-6 of the sixth row with reference to a lookup table 199*a* or a gamma table stored in the memory 130.

The processor 120 may control the electronic device 101 to apply the same driving current to the plurality of light-emitting devices 193-1 to 193-6, and perform a gradation layer mask process to calibrate the luminance and color for each row of the plurality of light-emitting devices 193-1 to 193-6. For example, as shown in FIG. 8, each portion corresponding to the plurality of light-emitting devices 193-1 to 193-6 may generate a masking image 199*b* that gradually darker from the light-emitting devices 193-1 of the first row toward the light-emitting devices 193-6 of the sixth row. The lights emitted from the plurality of light emitting devices 193-1 to 193-6 may represent different luminance for each row through the masking image 199*b*.

According to an embodiment, the projection display 190 may vary the distance between rows of the plurality of light-emitting devices 193-1 to 193-6, vary the thickness of each row of the plurality of micro-lenses 195-1 to 195-6, to vary the luminance of the plurality of light-emitting devices according to the focal distance, thereby displaying more information than information displayed on the display module 160 on the display area DA located on a part of the body or clearly displaying an image or video of a larger size. Therefore, the user may easily check information displayed on the display area DA through the projection display 190 with the naked eye while the user wearing the wearable electronic device 101 moves.

Figure 9A:
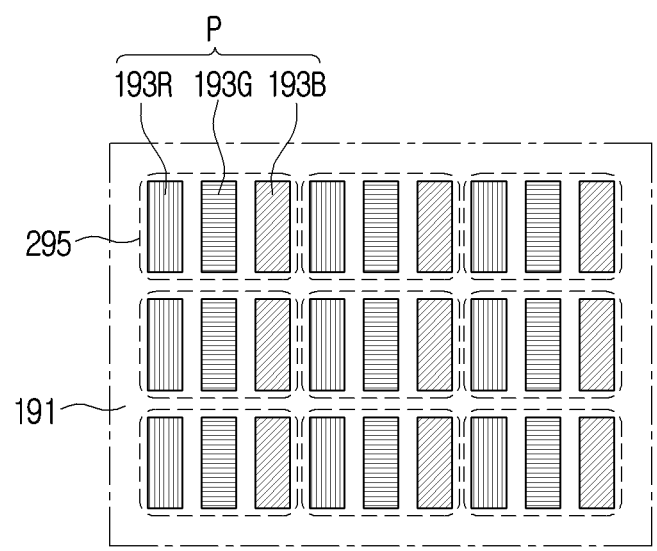
FIGS. 9A, 9B and 9C are diagrams illustrating examples in which at least one micro-lens included in the projection display corresponds to at least two light-emitting devices according to various embodiments.
Figure 9B:
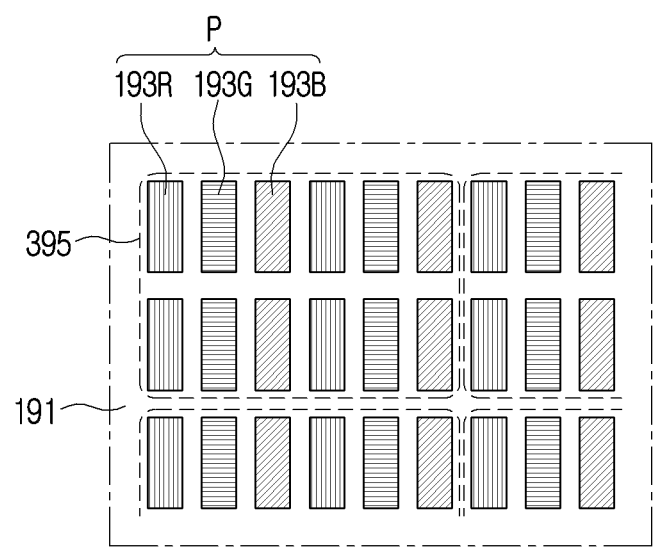
Figure 9C:
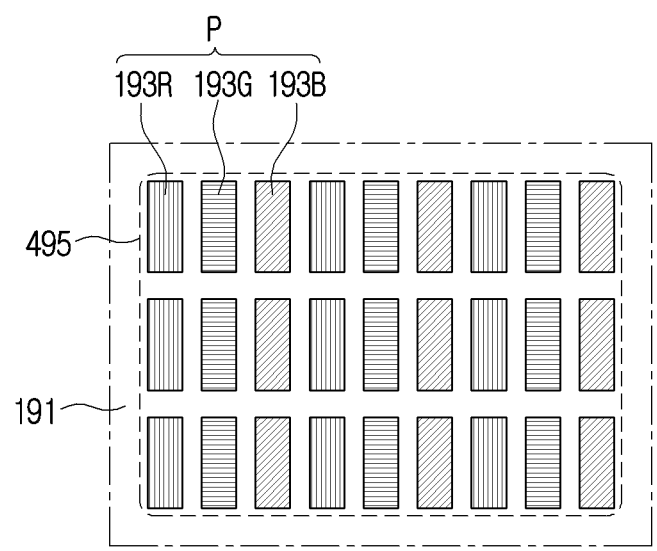

According to an embodiment, the plurality of micro-lenses 195-1 to 195-6 may correspond to the plurality of light-emitting devices 193-1 to 193-6 in a 1:1 manner, but are not limited thereto, and one micro-lens may correspond to at least two light-emitting devices as shown in FIGS. 9A, 9B and 9C (which may be referred to as FIGS. 9A to 9C).

Referring to FIG. 9A, one micro-lens 295 may correspond to three light-emitting devices (e.g., three sub-pixels 193R, 193G, and 193B). In this example, one micro lens 295 corresponds to one pixel (P). Referring to FIG. 9B, one micro-lens 395 may correspond to twelve sub-pixels. In this example, one micro-lens 395 corresponds to four pixels P. Referring to FIG. 9C, one micro-lens 495 may correspond to 27 subpixels. In this example, one micro-lens 495 corresponds to nine pixels P. As such, one micro-lens may correspond to one sub-pixel or correspond to at least two sub-pixels.

Figure 10:
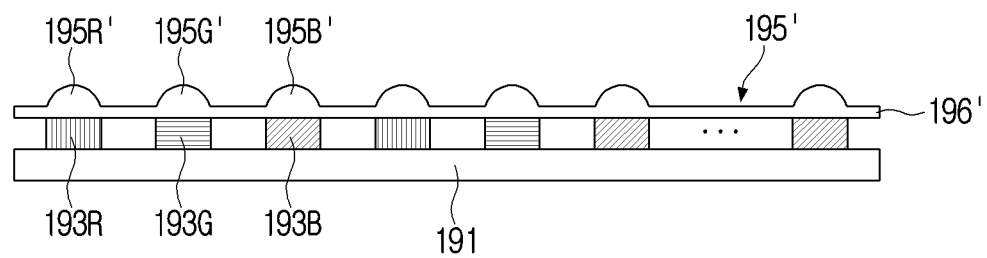
FIG. 10 is a sectional view illustrating an example projection display including a lens array in a film type according to various embodiments.

FIG. 10 is a sectional view illustrating a projection display including a lens array in a film type according to various embodiments.

Referring to FIG. 10, the lens array 195' may be formed of a film type and may be stacked on a light emitting surface of the plurality of light emitting devices 193R, 193G, 193B.

The lens array 195' may include a sheet layer 196' in direct contact with the light emitting surface of the plurality of light emitting devices 193R, 193G, and 193B, and a plurality of micro lenses 195R', 195G', 195B' integrally arranged in the sheet layer 196'. In this example, the plurality of micro-lenses 195R', 195G', and 195B' may be arranged in 1:1 manner for the plurality of light emitting devices 193R, 193G, and 193B. However, the embodiment is not limited thereto, and the size and arrangement may be appropriately changed such that one micro-lens corresponds to at least two light-emitting devices.

The lens array 195' may be produced in various ways. For example, the lens array 195' may be formed by a high temperature reflow method, a grayscale mask photolithography method, a molding/imprinting method, a dry etching pattern transfer method, and the like.

In the high temperature reflow method, a planarization layer covering a plurality of light-emitting devices is formed on a substrate on which a plurality of light-emitting devices are arranged, and an optical layer made of a photosensitive polymer is laminated on the planarization layer. When the optical layer is heated for a predetermined period of time by forming cells corresponding to each micro-lens on the optical layer, the optical layer is melted to be liquid to form a plurality of micro-lenses having a predetermined curvature by surface tension. In this example, the planarization layer may be made of an optical material or an optical adhesive. The planarization layer may refer, for example, to a material that is hardened in response to light (e.g., ultraviolet rays) in the designated bandwidth and may include, for example, an optical clear adhesive (OCA), an optical clear resin (OCR), or a super view resin (SVR). The planarization layer may include a material capable of maintaining high transparency even in a high temperature or high humidity environment.

The grayscale mask photolithography method may refer, for example, to a method of placing the mask on an optical layer and molding the optical layer into multiple micro lenses by exposure and developing. In this example, the mask may form a gradation pattern in which the most convex part of the micro-lens is the opaquest and gradually becomes less opaque as it moves toward the periphery of the micro lens.

The molding/imprinting method may refer, for example, to a method of molding the optical layer into a large number of micro-lenses by pressurizing the optical layer under a predetermined temperature using a stamp formed with a large number of grooves in the dome shape corresponding to the micro-lens.

The dry etching pattern transfer method may refer, for example, to a method of molding an optical layer into a plurality of micro-lenses by plasma etching.

Before molding multiple micro-lenses by various methods as described above, the position where multiple micro-lenses will be molded may be preceded by the process of aligning with the position of the light-emitting device corresponding to each micro-lens.

Figure 11:
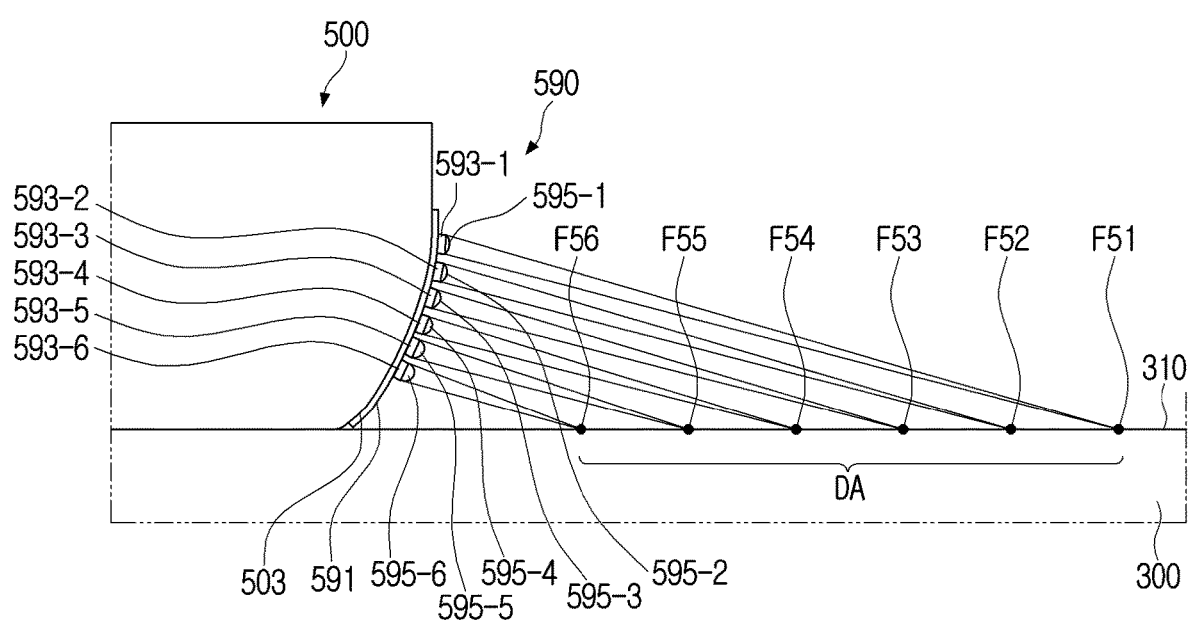
FIG. 11 is a diagram illustrating an example of a projection display and a mounting surface of a housing according to various embodiments.

FIG. 11 is a diagram illustrating an example of a projection display and a mounting surface of a housing according to various embodiments.

Referring to 11, a mounting surface 503 located on the side of a housing 500 may include a convexly formed surface toward the outside of the housing 500. In this example, a projection display 590 may be coupled to the housing (mounting surface 503).

The substrate 591 may maintain a shape protruding at a predetermined curvature convexly toward the outside of the housing 500 along the shape of the mounting surface 503. As the substrate 591 maintains a curved shape, a number of light emitting devices 593-1 to 593-6 arranged in a lattice shape on the substrate 591 may have the substrate 591 of which the directional angle is set differently by rows.

For example, the first row of light emitting devices 593-1 most adjacent to the top of the side of the housing 500 may be arranged to emit light toward the portion farthest from the housing 500 of the DA. The second row of light-emitting devices 593-2 may be arranged to emit light toward a portion closer to the housing 500 than where the first row of light-emitting devices 593-1 is projected in the DA. In this manner, the light-emitting devices 593-3 to 593-6 by remaining rows may be arranged to emit light toward the gradually closer part of the housing 500 as the devices are placed from the side to the lower portion of the housing 500.

According to an embodiment, the plurality of micro-lenses 595-1 to 595-6 may focus the light emitted from the corresponding light emitting devices 593-1 to 593-6 to each point in the DA.

According to an embodiment, as the plurality of light-emitting devices 593-1 to 593-6 have different directional angles for each row, the focal distance from the light-emitting devices 593-1 to 593-6 for each row to the DA should be set to be different from each other.

For example, since the micro-lenses 595-1 to 595-6 having different thicknesses for each row of the plurality of light-emitting devices are provided, the focal distance may be set differently. The micro-lenses 595-1, which are respectively coupled to the light-emitting devices 593-1 of the first row (hereinafter, micro-lenses of the first row), may have the thinnest thickness, and may have a thickness gradually thicker from the micro-lenses 595-2 coupled to the light-emitting devices 593-2 of the second row toward the micro-lenses 595-6 coupled to the light-emitting devices 593-6 of the sixth row, respectively. Accordingly, the thickness of the micro-lenses 595-1 in the first row may be the thinnest and the thickness of the micro-lenses 595-6 in the sixth row may be the thickest.

Accordingly, the micro-lenses 595-1 of the first row may focus the light emitted from the light-emitting devices 593-1 of the first row to the first point F51-1 farthest from the housing 200 in the display area DA. The micro-lenses 595-2 of the second row may focus the light emitted from the light-emitting devices 593-2 of the second row to a second point F52 that is closer to the housing 500 than the first point F51 in the display area DA. The micro-lenses 595-3 to 595-6 of the third to sixth rows may focus the light emitted from the light-emitting devices 593-3 to 593-6 of the third to sixth rows to points F53 to F56 that are gradually closer to the housing 500 than the second point F52 in the display area DA. In the disclosure, the first to sixth points F51 to F56 may be referred to as first to sixth focal points, respectively.

According to an embodiment, the projection display 590 (see FIG. 11) may, if the distance between the points adjacent to each other remains the same or approximately the same as the above-described projection display 190 (see FIG. 6), the display format of the information displayed in the display area (DA) may not be distorted. Taking this into account, the projection display 590 may be adjusted appropriately, such as maintaining different pitches between each row of a number of light-emitting devices 193-1 to 193-6.

According to an embodiment, the plurality of light-emitting devices 593-1 to 593-6 may have different luminance depending on the focal distance. For example, with respect to the luminance of the light-emitting device 595-6 of the row with the nearest focal distance, the luminance may become larger toward the light-emitting devices 595-1 of the row having the distant focal distance. Accordingly, an image or a video of the display area DA may be clearly displayed. In this example, as described above with reference to FIGS. 6 and 7, by referring to a lookup table or a gamma table, it may be controlled that the gradually less driving current (a value) is applied from the light emitting devices 593-1 of the first row toward the light emitting devices 593-6 of the sixth row, or the same driving current is applied to the plurality of light emitting devices 593-1 to 593-6, and gradation layer mask processing is to be performed to calibrate luminance and color of each row of the plurality of light emitting devices 193-1 to 193-6.

Figure 12:
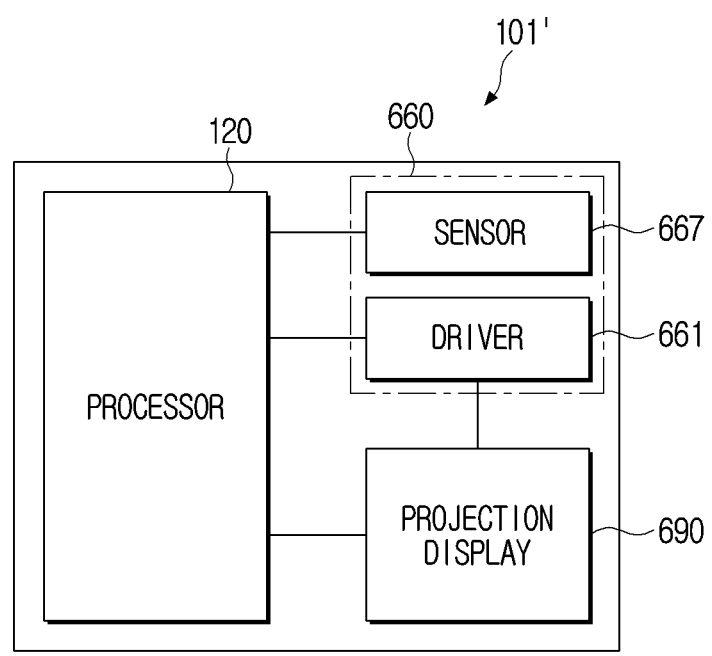
FIG. 12 is a block diagram illustrating an example configuration of a wearable electronic device according to various embodiments.
Figure 13:
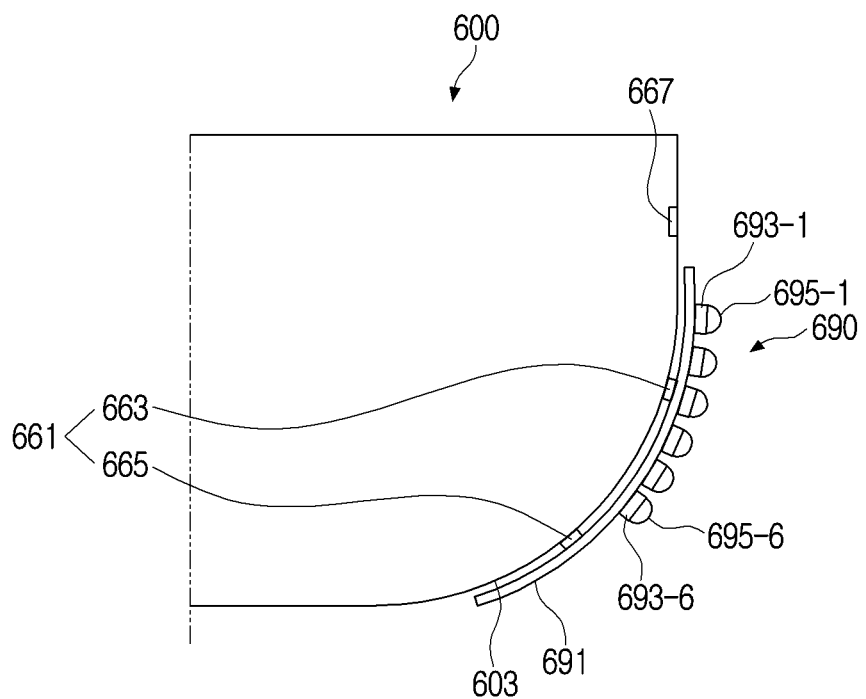
FIG. 13 is a diagram illustrating a tilting controller to tilt a projection display according to various embodiments.
Figure 14:
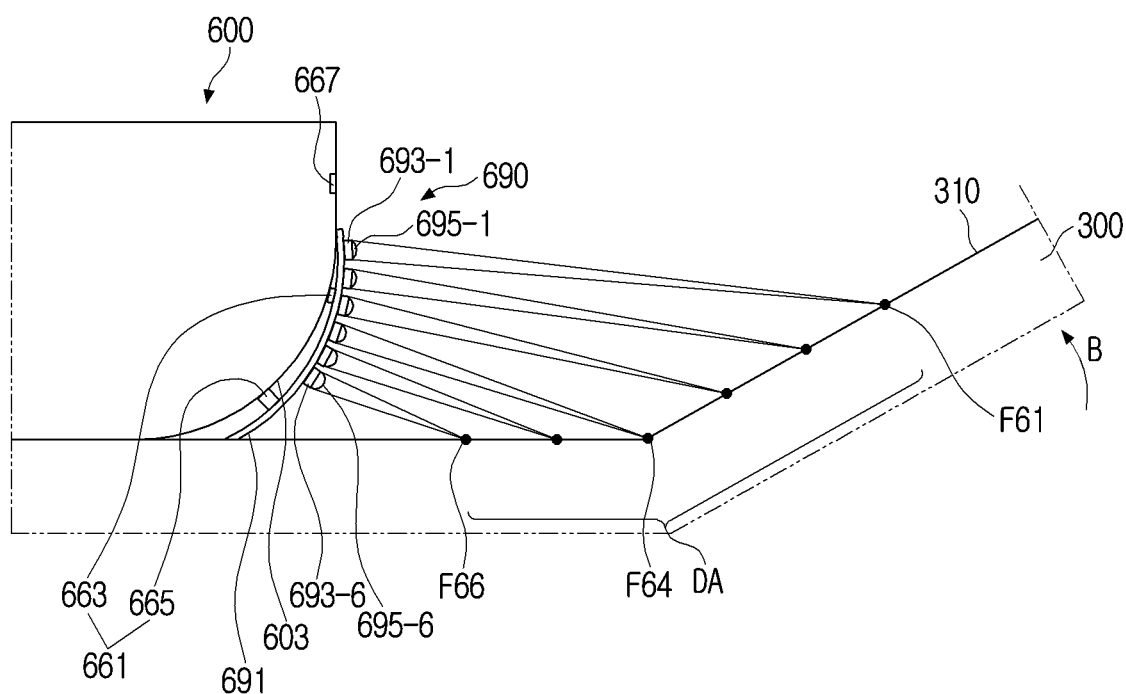
FIG. 14 is a diagram illustrating a state in which a projection display is tilted in one direction according to various embodiments.

FIG. 12 is a block diagram illustrating an example configuration of a wearable electronic device according to various embodiments. FIG. 13 is a diagram illustrating an example tilting controller to tilt a projection display according to various embodiments. FIG. 14 is a diagram illustrating an example state in which a projection display is tilted in one direction according to various embodiments.

Referring to FIGS. 12 and 13, a wearable electronic device 101' according to various embodiments may include a tilting controller (e.g., including tilt control circuitry) 660 for tilting the projection display 690, which is placed on the mounting surface 603 of the side of the housing 600 clockwise or counterclockwise.

According to an embodiment, the tilting controller 660 may include a driver 661 disposed between the mounting surface 503 of the housing 500 and the substrate 691 of the projection display 690 and a sensor 667 for detecting the position of the display area (DA).

According to an embodiment, the driver 661 may include a first piezoelectric device 663 and a second piezoelectric device 665, which are placed at the top and bottom of the rear surface of the substrate 691, respectively. The first piezoelectric device 663 may increase the thickness when the current is applied in one direction, and the thickness may be reduced if the current is applied in the reverse direction, which is the opposite direction of the one direction. In the second piezoelectric device 665, like the first piezoelectric device 663, the thickness may increase when the current is applied in one direction, and the thickness may be reduced if the current is applied in the reverse direction.

According to an embodiment, by controlling to change the thickness of the first and second piezoelectric devices 663 and 665 of the driver 661, the projection display 690 may be tilted clockwise or counterclockwise at a predetermined angle. For example, if the current is applied in one direction to the first piezoelectric device 663 and the current is applied in the reverse direction to the second piezoelectric device 665, the thickness of the first piezoelectric device 663 may increase and the thickness of the second piezoelectric device 665 may decrease, and the projection display 690 may be tilted at a predetermined angle in the clockwise direction. If the current is applied in the reverse direction to the first piezoelectric device 663 and the current is applied in one direction to the second piezoelectric device 665, the thickness of the first piezoelectric device 663 may decrease and the thickness of the second piezoelectric device 665 may increase, and the projection display 690 may be tilted at a predetermined angle in a counterclockwise direction.

According to an embodiment, the sensor 667 may be disposed in a portion of the housing 600. For example, the sensor 667 may be disposed on either side of the housing 600 adjacent the mounting surface 603. The sensor 667 may sense the position of the display area DA and transmit the position detection signal to the processor 120. The sensor 667 may be a distance sensor that detects a distance between the housing 600 and any one portion of the display area DA.

According to an embodiment, while the user may maintain a hand 300 wearing the wearable electronic device 101' at an approximately horizontal state (see the posture of the hand 300 shown in FIG. 11) and may bend the wrist in direction B as FIG. 14 and the hand 300 may be tilted. The sensor 667 may detect a distance between the side of the housing 600 and the display area DA and transmit the detected distance to the processor 120. The processor 120 may include various processing circuitry and control the driver 661 according to the received distance value to adjust the tilting angle of the projection display 690.

For example, when the back light 310 is upwardly inclined at a predetermined angle as shown in FIG. 14, the display area DA may be inclined obliquely with respect to a portion (e.g., a portion between a first point F61 to a fourth point F64) and a remaining portion (e.g., a portion between a fourth point F64 to a sixth point F66). In this example, the display area DA may be positioned closer to the light emitting devices 693-1 to 693-3 of the first to third rows compared to the example where one portion is disposed approximately horizontally. The focal distance of the light projected from the light emitting devices 693-1 to 693-3 of the first to third rows may be varied as shown in FIG. 12 according to a position of a portion.

For this purpose, a number of micro lenses 695-1 to 695-6 may be variable focal lenses that may change the focal length as the thickness varies. For example, a number of micro lenses 695-1 to 695-6 may be liquid lenses that adjust the thickness of the lens by applying an electric field to an optical fluid body encapsulated in an elastic film.

Figure 15:
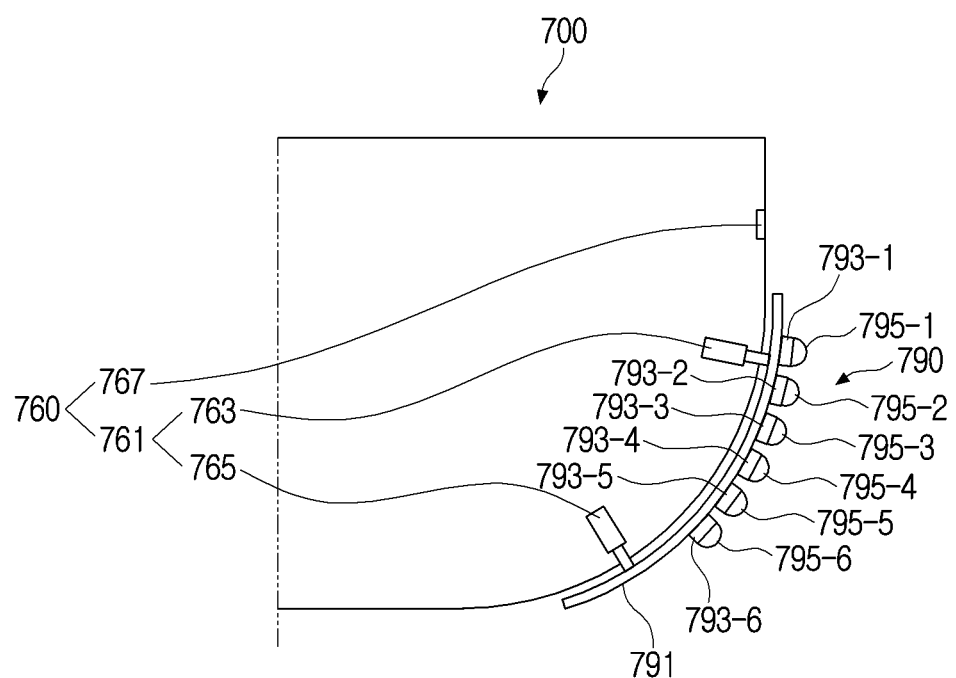
FIG. 15 is a diagram illustrating an example of the tilting controller to tilt the projection display according to various embodiments.

FIG. 15 is a diagram illustrating an example of the tilting controller to tilt the projection display according to various embodiments.

Referring to FIG. 15, according to an embodiment, a tilting controller 760 may use a linear micro actuator in addition to the piezoelectric device for the driver 761.

For example, the first and second micro-actuators 763, 765 may be connected to the rear upper and lower portions of the substrate 791, where one portion each is placed inside the housing 700 and the remaining stretchable portion (e.g., piston rod) protrudes outside the housing 700.

According to an embodiment, driving of the first and second micro-actuators 763, 765 may be controlled by the processor 120 according to the position of the display area (see DA of FIG. 14) detected by the sensor 767, and the tilting angle of the projection display 790 may be adjusted.

According to an embodiment, the projection display 790 may be applied as a variable focus lens capable of changing the focal distance of a number of micro lenses 795-1 to 795-6 coupled to the number of luminescent devices 793-1 to 793-6 in a corresponding manner.

The wearable electronic device 101 according to an example embodiment may include: the display module 160 comprising a display, a housing to which the display module 160 is coupled, and a projection display 190 disposed at a side of the housing 200 and configured to display information in a display area (DA) adjacent to the housing 200.

According to various example embodiments, the projection display 190 may include the substrate 191 disposed along the mounting surface 203 provided in a side of the housing 200, a plurality of light-emitting devices 193-1 to 193-6 comprising light-emitting circuitry disposed on the substrate 191 in a grating arrangement, and a plurality of micro-lenses 195-1 to 195-6 covering a light-emitting surface of the plurality of light-emitting devices 193-1 to 193-6.

According to various example embodiments, the plurality of light-emitting devices 193-1 to 193-6 may be disposed to have different directional angles for each row.

According to various example embodiments, the plurality of micro-lenses 195-1 to 195-6 may have different focal distances for each row.

According to various example embodiments, the mounting surface 203 may be a curved surface concave toward the housing 200.

According to various example embodiments, a thickness of the plurality of micro-lenses 195-1 to 195-6 may gradually decrease from a row of the light-emitting devices 193-1 closest to an upper portion of the side of the housing 200 toward a row of the light-emitting devices 193-6 located farthest from the upper portion of the side of the housing.

According to various example embodiments, an interval between rows of the plurality of light-emitting devices gradually decreases from a row of the light-emitting devices 193-1 closest to an upper portion of the side of the housing 200 toward a row of the light-emitting devices 193-6 located farthest from the upper portion of the side of the housing.

According to various example embodiments, a luminance of the plurality of light-emitting devices gradually may increase from a row of the light-emitting devices 193-1 closest to an upper portion of the side of the housing 200 toward a row of the light-emitting devices 193-6 located farthest from the upper portion of the side of the housing.

According to various example embodiments, a mounting surface 503 may include a curved surface convex toward an outside of the housing 500.

According to various example embodiments, the thickness of the plurality of micro-lenses may gradually increase from a row of the light-emitting devices 593-1 closest to an upper portion of the side of the housing 500 toward a row of the light-emitting devices 593-6 located farthest from the upper portion of the side of the housing.

According to various example embodiments, the luminance of the plurality of light-emitting devices may gradually decrease from a row of the light-emitting devices 593-1 closest to an upper portion of the side of the housing 500 toward a row of the light-emitting devices 593-6 located farthest from the upper portion of the side of the housing.

According to various example embodiments, a wearable electronic device 101' may further include a tilting controller 660, disposed in the housing 600, configured to control an orientation of the projection display 690.

According to various example embodiments, the tilting controller 660 may include a sensor 667, disposed in a side of the housing 600 configure to detect a distance between the housing 600 and at least one point of an area where an image projected from the projection display 690 is displayed; and a driver 661 comprising circuitry configured to adjust a tilting angle of the projection display 690 based on a position of the DA detected by the sensor 667.

According to various example embodiments, the driver 661 may include a first driving member and a second driving member 663, 665 disposed between the housing 600 and a rear surface of the substrate 691, the first driving member 663 may be disposed to be a first distance from an upper portion of a side of the housing 600, and the second driving member 665 may be disposed to be a second distance from the upper portion of the side of the housing greater than the first distance.

According to various example embodiments, the first and second driving members 663, 665 may include a piezoelectric element configured to have a length that varies based on a direction of an applied current.

According to various example embodiments, each of the first and second driving members 763, 765 may comprise a linear micro actuator connected to the projection display 790 and configured to push or pull the projection display 790.

According to various example embodiments, the micro-lens 195' may comprise a film type lens array.

According to various example embodiments, one micro-lens may cover one light-emitting device or two or more light-emitting devices.

According to various example embodiments, the plurality of micro-lenses 695-1 to 695-6 comprise lenses having variable focal distance.

The wearable electronic device 101 according to various example embodiments may include the first display 160, the housing 200 to which the first display 160 is coupled and the second display 190 disposed on a side portion of the housing 200 configured to display information on a display area adjacent to the housing 200, the second display 190 may include a plurality of light-emitting devices 193-1 to 193-6 comprising light-emitting circuitry disposed in a grating arrangement, and a plurality of micro-lenses 195-1 to 195-6 covering at least one light-emitting device, wherein the plurality of micro-lenses 195-1 to 195-6 may have different thicknesses so that focal distances of light projected from a plurality of light-emitting devices 193-1 to 193-6 are different.

While the disclosure has been illustrated and described with reference to various example embodiments, it will be understood that the various example embodiments are intended to be illustrative, not limiting. It will be further apparent to those skilled in the art that various modifications may be made b, without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:
    a display module comprising a display;
    a housing to which the display module is coupled; and
    a projection display disposed on a side portion of the housing and configured to display information on a display area adjacent to the housing,
    wherein the projection display comprises:
        a substrate disposed along a mounting surface on the side portion of the housing;
        a plurality of light-emitting devices comprising light-emitting circuitry disposed on the substrate in a grating arrangement; and
        a plurality of micro-lenses covering a light-emitting surface of the plurality of light-emitting devices,
    wherein the mounting surface of the substrate comprises a curved surface,
    wherein the plurality of light-emitting devices are disposed having different directional angles for each row depending on the curved surface of the mounting surface, and
    wherein the plurality of micro-lenses has different focal distances for each row.

2. The wearable electronic device of claim 1, wherein the curved surface of the mounting surface is formed concavely toward an inside of the housing.

3. The wearable electronic device of claim 2, wherein a thickness of the plurality of micro-lenses gradually decreases from a row of the light-emitting devices closest to an upper portion of the side portion of the housing toward a row of the light-emitting devices located farthest from the upper portion of the side portion of the housing.

4. The wearable electronic device of claim 2, wherein an interval among rows of the plurality of light-emitting devices gradually decreases from a row of the light-emitting devices closest to an upper portion of the side portion of the housing toward a row of the light-emitting devices located farthest from the upper portion of the side portion of the housing.

5. The wearable electronic device of claim 2, wherein a luminance of the plurality of light-emitting devices gradually increases from a row of the light-emitting devices closest to an upper portion of the side portion of the housing toward a row of the light-emitting devices located farthest from the upper portion of the side portion of the housing.

6. The wearable electronic device of claim 1, wherein the curved surface of the mounting surface is formed convexly toward an outside of the housing.

7. The wearable electronic device of claim 6, wherein a thickness of the plurality of micro-lenses gradually increases from a row of the light-emitting devices closest to an upper portion of the side portion of the housing toward a row of the light-emitting devices located farthest from the upper portion of the side portion of the housing.

8. The wearable electronic device of claim 6, wherein a luminance of the plurality of light-emitting devices gradually decreases from a row of the light-emitting devices closest to an upper portion of the side portion of the housing toward a row of the light-emitting devices located farthest from the upper portion of the side portion of the housing.

9. The wearable electronic device of claim 1, further comprising a tilting controller, disposed in the housing, configured to control an orientation of the projection display.

10. The wearable electronic device of claim 9, wherein the tilting controller comprises:
    a sensor, disposed in a side of the housing, configured to detect a distance between the housing and at least one point of an area where an image projected from the projection display is displayed; and
    a driver comprising circuitry configured to adjust a tilting angle of the projection display based on an angle detected by the sensor.

11. The wearable electronic device of claim 10, wherein the driver comprises a first driving portion and a second driving portion disposed between the housing and a rear surface of the substrate,
    wherein the first driving portion is disposed at a first distance from an upper portion of the side portion of the housing, and
    wherein the second driving portion is disposed at a second distance from the upper portion of the side portion of the housing farther than the first driving portion.

12. The wearable electronic device of claim 11, wherein the first and second driving portions comprise a piezoelectric element including a piezoelectric material having a length configured to vary based on a direction of an applied current.

13. The wearable electronic device of claim 11, wherein each of the first and second driving portions comprises a linear micro actuator connected to the projection display configured to push or pull the projection display.

* * * * *